(12) United States Patent
Gauthier

(10) Patent No.: US 6,609,770 B2
(45) Date of Patent: Aug. 26, 2003

(54) CATERPILLAR MADE OF ELASTOMER MATERIAL

(75) Inventor: Gilbert Gauthier, Cournon d'Auvergne (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/915,900

(22) Filed: Jul. 26, 2001

(65) Prior Publication Data

US 2002/0050741 A1 May 2, 2002

(30) Foreign Application Priority Data

Jul. 27, 2000 (FR) ............................................. 00 09885

(51) Int. Cl.⁷ .............................................. B62D 55/00
(52) U.S. Cl. ........................ 305/167; 305/157; 305/179; 264/273
(58) Field of Search .................................. 305/157, 177, 305/171, 165, 160, 167, 169, 174, 175, 178, 179; 264/273, 267, 279.1, 163, 154, 266, 271, 138, DIG. 44

(56) References Cited

U.S. PATENT DOCUMENTS

| 3,516,467 | A | * | 6/1970 | Sims | 152/154.2 |
|---|---|---|---|---|---|
| 4,168,393 | A | * | 9/1979 | Silva | 174/73.1 |
| 4,535,827 | A | * | 8/1985 | Seaford | 152/323 |
| 5,511,869 | A | * | 4/1996 | Edwards et al. | 305/100 |
| 5,839,847 | A | * | 11/1998 | Patel | 403/265 |
| 5,984,438 | A | * | 11/1999 | Tsunoda et al. | 305/169 |
| 6,079,802 | A | * | 6/2000 | Nishimura et al. | 305/157 |
| 6,203,125 | B1 | * | 3/2001 | Arakawa et al. | 305/166 |
| 6,220,199 | B1 | * | 4/2001 | Williams | 116/206 |

FOREIGN PATENT DOCUMENTS

| DE | 1800353 | 7/1969 |
|---|---|---|
| EP | 0351492 | 1/1990 |
| FR | 957422 | 2/1950 |
| GB | 2209814 | 5/1989 |

\* cited by examiner

*Primary Examiner*—S. Joseph Morano
*Assistant Examiner*—Frantz F. Jules
(74) *Attorney, Agent, or Firm*—Baker Botts L.L.P.

(57) ABSTRACT

A caterpillar made from elastomer material and having a plurality of guide teeth projecting from the inside surface of the caterpillar, the said guide teeth having lateral faces and front and rear faces in the longitudinal direction of the caterpillar, with at least one insert arranged inside each guide tooth, the caterpillar being characterized in that each insert located inside each guide tooth has a generally hollow shape enclosing a free volume to absorb in large measure the expansion of the elastomer material of the guide tooth during the molding and cross-linking of the material.

12 Claims, 4 Drawing Sheets

CATERPILLAR MADE OF ELASTOMER MATERIAL

BACKGROUND OF THE INVENTION

The invention concerns caterpillars made of rubber for vehicles, and more particularly the reinforcement of the said caterpillars.

In what follows, "elastomer material" means a material comprising at least one elastomer that can be reinforced with at least one filler such as carbon black; diene elastomers, polyurethane and thermoplastic rubbers among others are examples of elastomer materials.

A caterpillar for a vehicle generally comprises:

- a strip forming a closed loop along a longitudinal direction of given width (in a transverse direction), with an inside and an outside surface, the said strip being mainly composed of at least one elastomer material;
- on the outside surface of the strip, a plurality of relief elements intended to make contact with the ground in order to ensure good traction of the vehicle fitted with the said caterpillar, the said relief elements themselves also being made of an elastomer material;
- on the inside of the strip, a plurality of teeth made of an elastomer material, comprising lateral faces and front and rear faces (the latter spaced apart in the longitudinal direction), these teeth being designed at least to guide the caterpillar in order to ensure good coupling between the caterpillar and the vehicle fitted therewith.

In addition, and bearing in mind the stresses to which a caterpillar fitted to a vehicle is subjected, it is known to provide inside the strip at least one reinforcement armature that ensures dimensional stability of the caterpillar in the longitudinal direction corresponding to the direction of the loop formed by the said caterpillar. This reinforcement armature generally consists of a plurality of cables arranged in the longitudinal direction or at a relatively small angle thereto, so as to confer upon the strip an appropriate extension rigidity in the longitudinal direction sufficient to resist the forces encountered in use.

It is also known to add a supplementary reinforcement armature comprising a stack of plies each formed of a plurality of reinforcing cables or cords arranged parallel to one another and which may cross over from one layer to the next.

Among vehicles fitted with elastomer caterpillars, there are two families depending on the function fulfilled by the teeth of the said caterpillars. In a first family the teeth only have a guiding function, i.e. once the caterpillar has been fitted on a vehicle, the teeth fit between the sides of two wheels of the vehicle to ensure good solidarity between the caterpillar and the vehicle. This solution, however, results in more or less severe wear of the lateral faces of the teeth that ensure guidance by contact with the sides of the guide wheels; if this wear becomes too pronounced, it is possible that under the transverse forces occurring while rounding a bend, the teeth will come out of their recess between the sides of the guide wheels and that the trajectory of the vehicle will then become uncontrollable.

In a second family of vehicles with caterpillars, the teeth play a dual role of guiding and of transmitting the caterpillar drive forces. The caterpillar is driven by at least one wheel positioned inside the caterpillar and having a plurality of transversely orientated bars that form a kind of "squirrel cage", each tooth that guides and moves the caterpillar fitting between two bars of the said wheel. Each bar of the drive wheel makes contact with the front face of a tooth, and this exerts contact stresses on the said face and produces shear stresses within the said tooth. These stresses may be the cause of wear on the front faces of the teeth (or the rear faces in the case of movement in reverse) and may therefore weaken the said teeth or even tear them off under the effect of repeated shearing. As described for the first family of vehicles, the teeth also guide the vehicle by virtue of the contact between their lateral faces and the drive wheels; the said lateral faces therefore also undergo more or less pronounced wear.

To reduce wear caused by friction on the lateral faces of the teeth, U.S. Pat. No. 5,984,438 proposes to provide each guiding tooth with a thermoplastic resin insert that emerges on at least one of the lateral faces of the said teeth.

Another solution is to make the teeth with relatively large volume so that a large amount of material has to be worn away before it becomes necessary to change the caterpillar. It has been found, however, that during the operation of molding inside a metallic mold, the temperature rise causes rubber materials to expand by much more than the expansion of the metallic mold; this large difference between the expansions gives rise to defects at the level of the strip's reinforcement armatures and in particular the armature whose reinforcing elements are essentially longitudinal. In effect, at each guiding tooth the expansion of the elastomer material in contact with the mold induces a bulge away from the mold that modifies the path of the armature; the armature then shows a plurality of undulations at each tooth which, during use under high tension and owing to the numerous successive cycles of curvature variation undergone by the said armature in use, increases the fatigue of the reinforcement in the said armature.

It should be mentioned that the solution proposed U.S. Pat. No. 5,989,438 does not solve this last problem because, short of replacing the entire volume of each tooth by an insert, the difference of the elastomer's expansion relative to that of the mold metal will still result in a modification of the geometry of the reinforcement armature.

On the other hand, it is the large volume of the teeth relative to the thickness of the strip which determines the cross-linking time of the said strip: to reach a satisfactory level of cross-linking at all points in the teeth (i.e. one that gives optimum physical characteristics), a longer time is needed than the time just needed to ensure proper cross-linking of the strip, and this is more costly in the industrial context.

In what follows, "guide tooth" will be used without differentiation to mean a tooth of a caterpillar of the first or second family, as described above.

SUMMARY OF THE INVENTION

One purpose of the invention is to propose an elastomeric caterpillar for a vehicle that does not show the disadvantages indicated earlier and in particular a caterpillar whose guide teeth are designed to reduce the cross-linking time without thereby distorting the reinforcement armatures.

To that end, a caterpillar comprises:

- a strip forming a closed loop of width L having an inside surface and an outside surface separated by its thickness E, the said strip consisting mainly of at least one elastomer material and being reinforced by at least one longitudinal reinforcement armature whose reinforcing elements are arranged essentially in the longitudinal direction of the strip;
- a plurality of relief elements projecting from the outside surface, these relief elements being intended to contact the ground to ensure good traction of the vehicle fitted with the said caterpillar;

a plurality of guide teeth with average height H projecting from the inside surface, these guide teeth comprising lateral faces and front and rear faces in the longitudinal direction;

at least one insert positioned inside each guide tooth; the said caterpillar being characterized in that:

each insert positioned within each guide tooth has a generally hollow shape forming a free space, the function fulfilled by this insert being to absorb most of the expansion of the elastomer of the guide tooth during the molding and cross-linking of the caterpillar, and to reduce the curing time of the elastomer by homogenizing the range of temperatures within the tooth.

Preferably, the hollow volume inside each inset is at least equal to the supplementary expansion volume of the elastomer.

In the caterpillar according to the invention, the presence of at least one insert having a generally hollow shape, i.e. one which reserves a volume that can be reduced by the expansion of the elastomer during molding and cross-linking, has the advantage that variations of the geometry of the longitudinal reinforcement armature during cross-linking are very considerably reduced or even completely eliminated, while at the same time the bond between the said insert and the elastomer material is improved by increasing the contact area between them.

In a first embodiment, it can be provided that each hollow insert is sufficiently deformable under the action of the forces exerted by the elastomer material during its thermal expansion, to absorb most of this expansion. In this way part of the volume reserve created by the hollow portion of the insert is utilized while still maintaining an excellent bond between the said insert and the elastomer material of the guide tooth.

Another variant is to provide in each insert a zone that can be deformed preferentially, for example by producing a zone of low rigidity that deforms plastically or even one that can be perforated under the forces exerted by the elastomer material.

Advantageously, the inserts are made from a material with appreciably higher thermal conductivity compared with the elastomer material of each tooth, to improve and homogenize the degree of cross-linking within each guide tooth.

Various shapes may be chosen for making the inserts, for example a hollow cylinder shape whether closed or not at its ends.

Another preferred variant consists in making each insert in the form of a hollow body having at least one opening to allow the elastomer material to enter the hollow portion of the said insert during the cross-linking of the said material. For example, a cylinder closed at both ends can be used, which has at least one orifice for the passage of the rubber, the said cylinder having a circular, elliptical or any other cross-section; the penetration of the elastomer material into the insert ensures good anchorage of the said insert in the tooth.

The cross-section of each orifice may be circular, oval or shaped as an elongated slot, granted that the orifices of each cylinder, taken together, must suffice to allow penetration of the desired quantity of elastomer material.

A combination of the embodiments described above may be used by a person familiar with the field, for example by the combination of a perforated insert which also has deformable zones.

An optimum result is achieved from the standpoint of the geometrical regularity of the longitudinal reinforcement armature and the geometry of the molded tooth, when each insert comprises a total area of openings calibrated as a function of the viscosity of the various elastomer material(s) used, so as to allow the appropriate quantity of mixture to pass into the hollow portion of the insert within a reaction time compatible with the molding and cross-linking time of a caterpillar.

To reduce the molding and cross-linking times for industrial purposes, it is advisable to make the inserts from materials with good thermal conductivity, to increase the diffusion rate of heat within the molded teeth. Among materials with good thermal conductivity, mention can be made of steel, alloys of copper or aluminium, or polymer materials having at least one filler in the form of metallic particles. The inserts may be made of PA66 filled with aluminium or iron oxide filings (EMI-Guard products manufactured by Thermofil).

Preferably, the inserts incorporated in each guide tooth do not emerge at any surface, so that the surfaces of the lateral walls and front and rear faces of the said teeth remain in good condition.

To carry out its guiding function, a caterpillar according to the invention is subjected to contact forces on the lateral faces of its guide teeth which will result in the progressive wear of the said teeth; to warn the user that the wear level has reached a point where the caterpillar must be changed, it is advantageous to provide each insert laterally with a portion whose color is different from that of the guide tooth. Thus, when the wear on the lateral faces of a tooth has reached a level regarded as critical, a colored part of the insert will appear and so warn the user in good time.

Advantageously, this wear warning function can be combined with the presence of a material that will not damage the guide wheels of the vehicle to which the caterpillar is fitted when the insert becomes visible on one of the lateral surfaces of a tooth, in particular a tribological alloy (notably: bronze or a molybdenum alloy), or a more abrasion-resistant elastomer.

This wear warning function can also be obtained by making the entire insert from a material whose color differs from that of the guide teeth.

The principle of the invention presented for making the teeth of a caterpillar, can easily be applied when making the relief elements that form the profile of the said caterpillar; it is in effect equally advisable to provide each element of the profile with at least one insert of generally hollow shape capable of absorbing the expansion of the elastomer material constituting the profile elements, to prevent this expansion from locally modifying the geometry of the caterpillar's reinforcement armatures.

Other characteristics and advantages of the invention will emerge from the description given below, referring to the attached drawings which illustrate non-limiting examples of embodiments of the invention.

DESCRIPTION OF PREFERRED EMBODIMENTS

Figure 1:
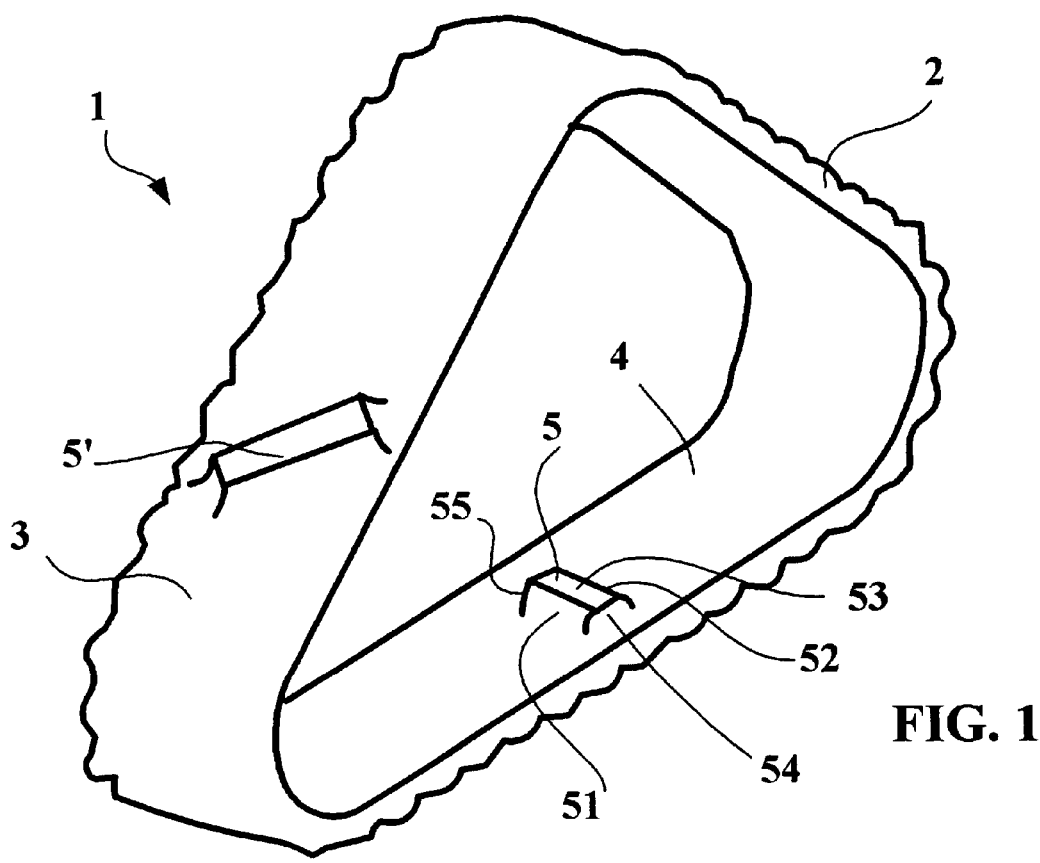
FIG. 1 is a perspective view of a rubber caterpillar.
Figure 2:
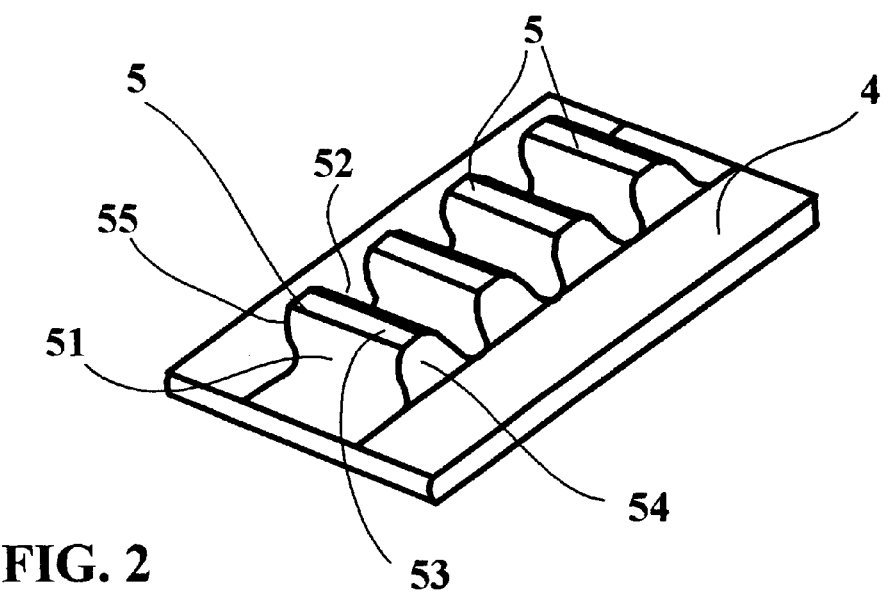
FIG. 2 is a partial view of the guide teeth according to a first embodiment of the invention.
Figure 3:
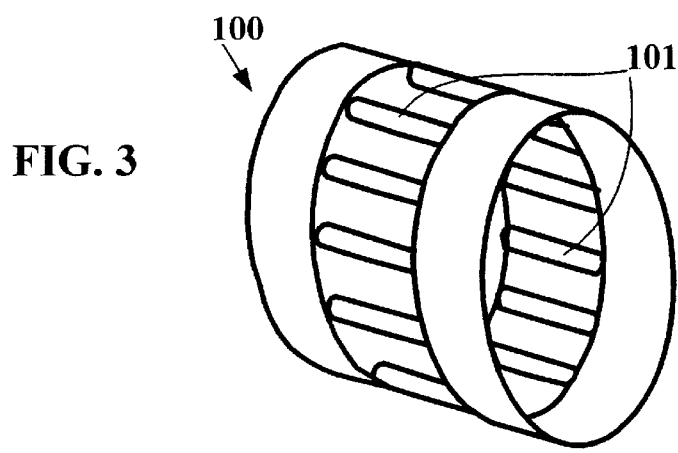
FIG. 3 shows a drive wheel of the "squirrel cage" type.

The caterpillar 1 shown in FIG. 1 and in an enlarged view in FIG. 2 is in the form of a continuous strip 2 delimited by an outside surface 3 and an inside surface 4. The longitudinal direction of the strip is defined as the direction of its greatest length and its transverse direction as the direction perpendicular to the longitudinal direction and to the thickness of the strip (the thickness corresponding to the average distance between the outside and inside surfaces 3 and 4 respectively). The strip 2 is provided on its outside surface 3 with a plurality of protuberances 5' intended to come in contact with the ground when the caterpillar is rolling (for convenience, only one protuberance 5' is shown). The strip 2 is provided on its inside surface 4 with a plurality of guide teeth 5 intended to cooperate with means of guiding the vehicle on which the caterpillar 1 is fitted. Each guide tooth 5 has a front face 51, a rear face 52, an upper face 53, and two lateral faces 54, 55 which can be seen in FIG. 2. In one embodiment shown in an enlarged view in FIG. 2, the teeth 5 are intended to co-operate with the flanges of guide wheels against which they come into contact on their lateral faces 54, 55. In another embodiment, the guide teeth shown in FIG. 2 are intended to co-operate with the bars 101 of a drive wheel 100 of the "squirrel cage" type, as shown in FIG. 3; in this last embodiment, besides their guiding function the front 51 or rear 52 faces of the guide teeth 5 make contact with the bars 101 when the caterpillar is driven in rotation by the drive wheel 100.

Figure 4:
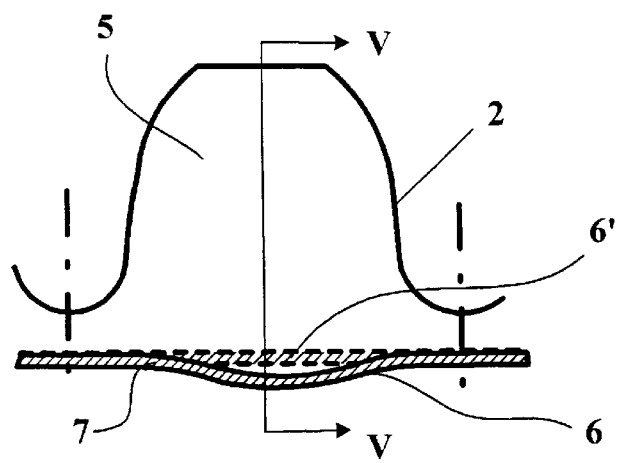
FIG. 4 is a section through a guide tooth of a caterpillar, in a plane containing the longitudinal direction of the caterpillar.
Figure 5:
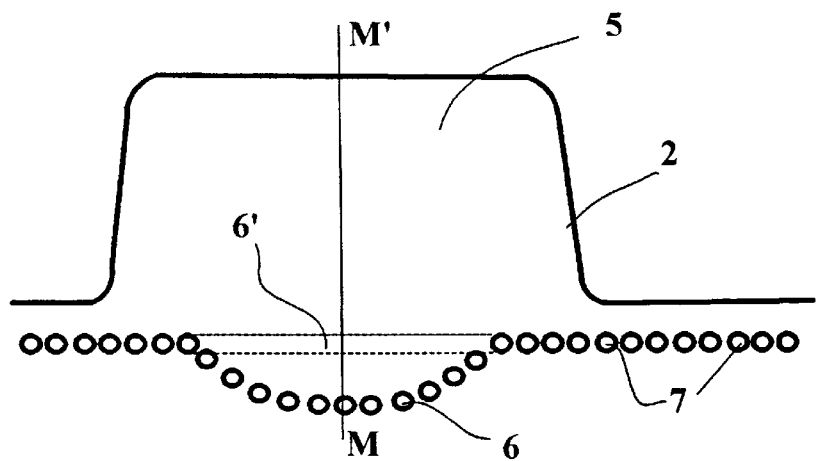
FIG. 5 is a section of the guide tooth in FIG. 4, along the line V—V of FIG. 4 in a plane perpendicular to the longitudinal direction of the caterpillar.

FIGS. 4 and 5 respectively represent longitudinal and transverse sections in two perpendicular planes of part of a caterpillar 2 according to the known art and close to a guide tooth 5; this section also shows a reinforcement armature 6 extending over most of the width of the caterpillar 2 and in its longitudinal direction; in this case the armature 6 consists of a ply of cables 7 essentially aligned in the longitudinal direction to render the caterpillar virtually inextensible in that direction. The example chosen is in no way limiting and the reinforcement armature could be formed of several plies of cables orientated longitudinally or even plies of cables inclined at a small angle relative to the longitudinal direction.

FIG. 4, which is drawn in a plane containing the longitudinal direction of the caterpillar, shows the geometry adopted by the reinforcement armature 6 after molding and vulcanization of the said caterpillar, while the geometry desired for it is marked by broken lines 6'. The geometry 6' corresponds essentially to the armature's geometry at the time when the strip is built up, but under the action of the deformation due to the expansion of the rubber mix(es) composing the tooth 5 during vulcanization, the geometry of this armature 6 is modified opposite each guide tooth. It is also found that the expansion of the mix(es) constituting each guide tooth modifies the distance between cables, which is larger in the median area of each tooth (indicated by the line MM' in FIG. 5, which shows the same guide tooth sectioned along a plane V—V).

These modifications of the geometry of the reinforcement armature lead to cyclic deformations of the cables 7 of the armature 6 which affect the mechanical fatigue endurance of the said cables adversely.

Figure 6:
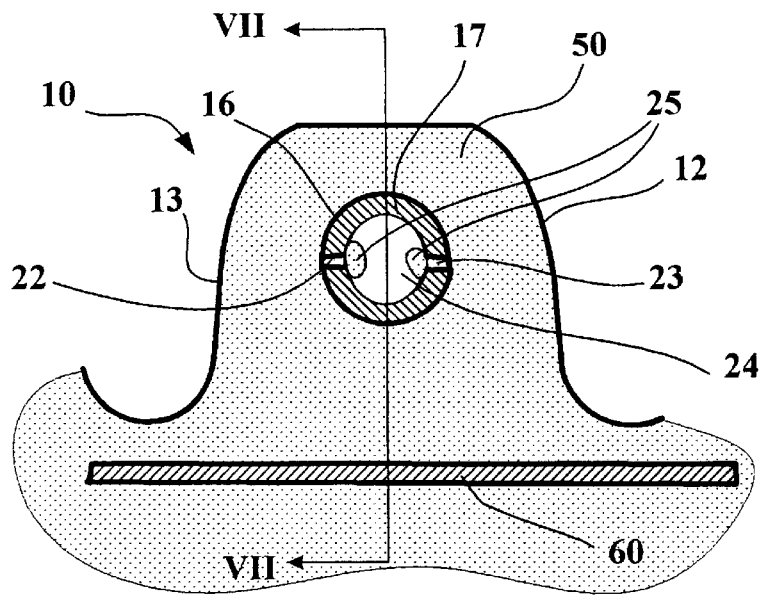
FIG. 6 shows a first embodiment of a guide tooth according to the invention, viewed in a section plane containing the longitudinal direction of a caterpillar.
Figure 7:
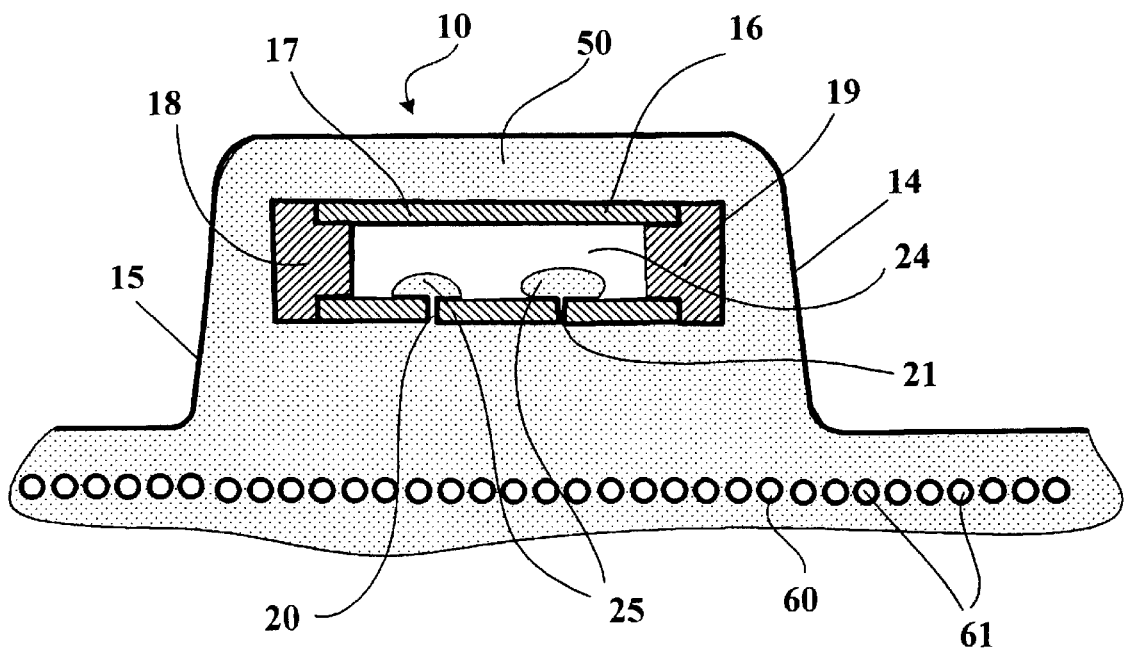
FIG. 7 is a section taken along the line VII—VII of FIG. 6.

A first variant embodiment of a caterpillar according to the invention is shown in FIGS. 6 and 7, which respectively show longitudinal and transverse sections in two perpendicular planes of the same caterpillar 10 after molding and vulcanization, close to the same guide tooth 50.

FIG. 6, which illustrates a guide tooth 50 after molding, shows the outlines of the front face 12 and rear face 13 while FIG. 7 shows the outlines of the lateral faces 14 and 15 of the guide tooth 50. This guide tooth comprises a hollow insert 16 closed at its two axial ends by plugs 18 and 19 that can be seen in FIG. 7. This hollow insert 16 has a metallic body 17 of generally cylindrical shape whose axis is essentially parallel to the transverse direction of the caterpillar 10 and whose mean cross-section is circular. Before the caterpillar 10 is built up, the plugs 18 and 19 are fitted onto the axial ends of this body 17 so as to define a hollow volume 24. A plurality of orifices 20, 21, 22, 23 are also formed in the body 17 of the insert 16 to allow the rubber mix(es) around the said insert to fill at least part of the hollow volume 24 during the molding and vulcanization phase as a result of the expansion of the said rubber mix(es). FIGS. 6 and 7 show the intrusions 25 of rubber that have made their way into the insert 16 through the orifices 20, 21.

The presence of the hollow insert 16 allows the temperature distribution in the tooth to be homogenized and appreciably reduces the time needed for vulcanization.

The orifices are preferably sized as a function of the viscosity of the rubber constituting the guide tooth in the temperature range between about 100° C. and the vulcanization temperature.

FIGS. 6 and 7 show that the insert very substantially eliminates any geometrical variation of the reinforcement armature 60 comprising a plurality of cables 61 and essentially preserves its initial geometry (before molding and vulcanization).

A variant of the example presented with reference to FIGS. 6 and 7 consists in making the body 17 from a non metallic material while the plugs 18 and 19 are made of a metallic material.

Preferably, the insert 16 does not emerge at any of the lateral faces when in the new condition, so as not to cause friction damage to the guiding means of the vehicle fitted with the caterpillar according to the invention.

Preferably, the plugs 18 and 19 are made of a material which, while being resistant to friction wear against the vehicle's guide means, does not itself give rise to excessive wear of the said means. Besides the well known polymer materials such as polyamides, the use of so-termed tribological alloys, such as bronze, can be considered.

Advantageously, the plugs 18 and 19 are made from a material whose color is different from that of the rubber mix(es) composing the tooth 50, to warn the user when the lateral faces of the said tooth have been worn down.

Figure 8:
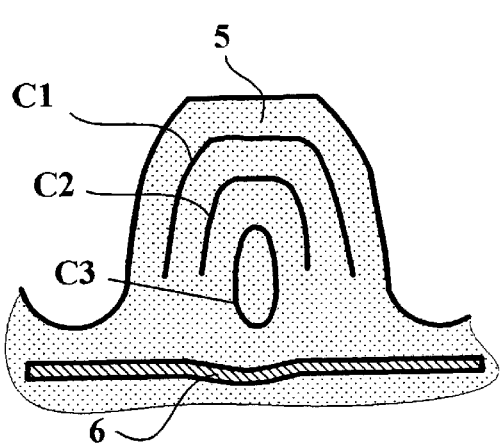
FIG. 8 shows a guide tooth of the prior art showing the isotherms during vulcanization of the rubber mixes.
Figure 9:
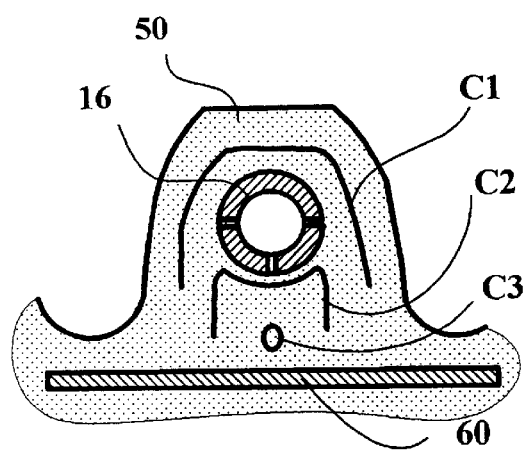
FIG. 9 shows, for the guide tooth shown in FIG. 6, the isotherms during vulcanization of the rubber mixes.

Besides its positive effect in conserving the geometry of the reinforcement armature, the use of an insert made from a material with thermal conductivity higher than that of the rubber mixes customarily used considerably improves the quality of the vulcanization of the rubber mixes while also reducing the vulcanization times. FIGS. 8 and 9, indeed, show the temperature isotherms recorded during the vulcanization of a caterpillar, within a guide tooth of the prior art (FIG. 8) and one according to the invention (FIG. 9).

FIG. 8 corresponds to the temperature recordings made in a guide tooth 5 of a caterpillar of the prior art such as that illustrated in FIG. 4. The curves $C_1, C_2, C_3$ are isotherms recorded during vulcanization after a given time T, $C_1$ corresponding to a temperature higher than $C_2$ which in turn corresponds to a temperature higher than $C_3$.

FIG. 9, which shows temperature measurements after the same time T in a caterpillar according to the invention and corresponding to that described by FIGS. 6 and 7, features the same isotherms $C_1, C_2, C_3$ inside a guide tooth 50 comprising a hollow insert 16 with better thermal conductivity than the surrounding rubber mixes. It can be seen that the isotherm $C_2$ is located deeper inside the tooth (i.e. closer to the armature 60 of the tooth) and that the isotherm $C_3$ is almost entirely located at the level of the armature 60. This is favorable in the industrial context because the vulcanization time of the caterpillar according to the invention can be reduced substantially, since the areas deepest inside the teeth reach the desired vulcanization temperature more quickly. Furthermore, the structure of a tooth according to the invention prevents over-curing phenomena of the outermost portions (i.e. those closest to the mold walls) which are subjected to elevated temperatures for a shorter time compared with the case of a caterpillar of the prior art.

Figure 10:
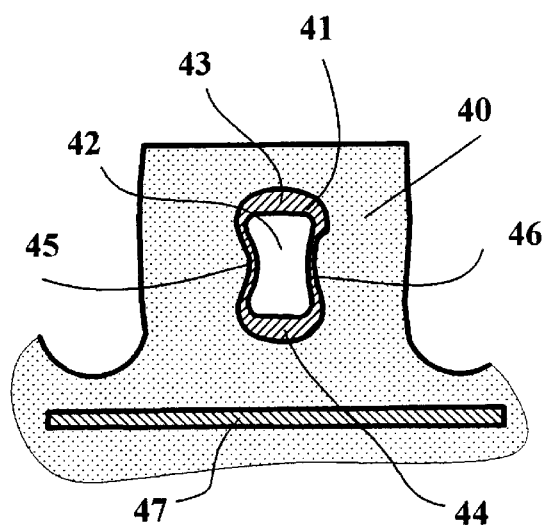
FIG. 10 is a variant embodiment of a tooth according to the invention, before vulcanization.
Figure 11:
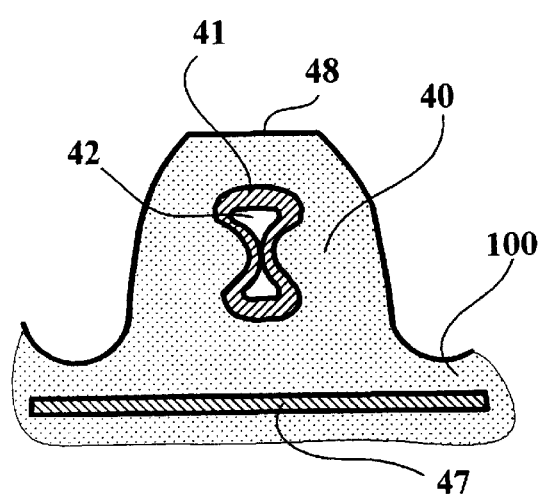
FIG. 11 shows the variant of FIG. 10 after vulcanization.

Another variant embodiment is shown in FIGS. 10 and 11. FIG. 10 shows in longitudinal section a partial view of a guide tooth 40 according to the invention before molding; this tooth 40 comprises an insert 41 made from a material colored in bulk and having the general shape of a hollow cylinder not closed at its axial ends, whose cross-section is shaped approximately like the number "eight" and defines a hollow volume 42. Besides, the wall thickness of this insert is not constant, having front and rear areas 45 and 46 whose thickness is appreciably less than the thickness of its other areas 43 and 44. These thinner areas 45, 46 are comparable to zones of weakness that can deform preferentially relative to the other areas under the action of the forces produced by the expansion of the mixes, as shown in FIG. 11 which represents the same tooth 40 after molding and vulcanization of the caterpillar 100. It can be seen that the absorption of the deformation due to the expansion of the mixes by deformation of the insert 41 and reduction of the hollow volume 42, have prevented any modification of the geometry of the reinforcement armature 47.

In another variant not illustrated by a drawing, the zones of weakness can be located close to the top surface 48 of the guide tooth and/or close to the armature 47. If each tooth consists of a plurality of rubber mixes, it is advisable to locate the zones of weakness (and the orifices, if any) close to the mixes having the highest expansion coefficients.

The outer surface of each tooth according to the invention, including the front and rear faces and the lateral faces, may be reinforced by at least one textile fabric that acts as protection against external aggression, as is widely known and practiced in the field of toothed belts.

The invention is not limited to the examples described and illustrated, and various modifications may be made without departing from its scope. In particular, the application of the invention to the relief elements forming the profile of the caterpillar (i.e. the elements molded on the outside surface of the strip forming the caterpillar) has the same advantages, since this makes it possible to absorb the expansion difference of the mixes constituting the said elements relative to the expansion of the mold components.

I claim:

1. A rubber track made of an elastomer material, comprising:
    a strip forming a closed loop with an inside surface and an outside surface, said
    strip made mainly of an elastomer material and being reinforced by at least one
    reinforcement armature whose reinforcing elements are essentially orientated in the longitudinal direction of the strip;
    a plurality of relief elements projecting from the outside surface, said relief elements being intended to make contact with the ground to ensure good traction of the vehicle fitted with said rubber track;
    a plurality of guide teeth made of an elastomer material and projecting from the inside surface, said guide teeth comprising lateral faces and front and rear faces in the longitudinal direction;
    at least one insert arranged inside each guide tooth or inside each relief element on the outside surface; and
    each insert has a generally hollow shape forming a free volume, said free volume being able to absorb the thermal expansion of the elastomer material surrounding said insert in the guide tooth or relief element resulting from the increase in temperature during the molding and vulcanization of the elastomer material of each tooth of the rubber track.

2. The rubber track according to claim 1, wherein the free volume of each insert is at least equal to the expansion volume of the elastomer materials surrounding each insert and forming the guide teeth or relief elements during the cross-linking of said elastomer materials.

3. The rubber track according to claim 1, wherein at least one of said hollow inserts comprises a zone of weakness that can deform under the action of the forces exerted by the elastomer material during its thermal expansion, so as appreciably to reduce the initial volume occupied by said at least one insert and thus to absorb most of said expansion.

4. The rubber track according to claim 3, wherein the zone of weakness is thinner than the other parts of said at least one insert, and is able to deform under the effect of the expansion of the materials surrounding said at least one insert, reducing its free volume.

5. The rubber track according to claim 4, wherein the zone of weakness has a thickness that allows it to be perforated by the material surrounding said at least one insert under the effect of the expansion of said material.

6. The rubber track according to claim 1, wherein at least one of said hollow inserts is provided with at least one orifice to allow the material surrounding said at least one insert to penetrate inside said insert under the action of the thermal expansion of said material.

7. The rubber track according to claim 6, wherein each orifice is sized as a function of the viscosity of the elastomer material surrounding said at least one insert, so as to allow the passage into the hollow portion of said at least one insert of a quantity of material sufficient to absorb essentially the whole of the expansion of said material.

8. The rubber track according to claim 1, wherein at least one of said hollow inserts is of cylindrical shape with its axis essentially parallel to the transverse direction of the rubber track, and at least one part of said at least one insert has a color different from that of the materials of the guide teeth/relief elements, so as to give warning of excessive wear of said teeth/relief elements.

9. The rubber track according to claim 1, wherein each hollow insert comprises at least one metallic portion having thermal conductivity higher than that of the elastomer material constituting each of the rubber track's teeth/relief elements.

10. The rubber track according to claim 9, wherein said metallic portion is made from an alloy selected from among tribological alloys.

11. The rubber track according to claim 10, wherein the alloy is selected from the class consisting essentially of bronze and molybdenum alloys.

12. A process to produce a rubber track made of an elastomer material, comprising the steps of:

forming a strip in the shape of a closed loop with an inside surface and an outside surface, said strip comprising an elastomer material and reinforced by at least one reinforcement armature, where said reinforcing elements are substantially oriented in the longitudinal direction of said strip;

adding to said strip a plurality of relief elements projecting from the outside surface, said relief elements intended to make contact with the ground to ensure good traction of a vehicle fitted with said rubber track;

adding to said strip a plurality of guide teeth made of an elastomer material projecting from the inside surface of said strip, said guide teeth comprising lateral faces and front and rear faces in the longitudinal direction of said strip;

inserting inside each guide tooth or inside each relief element on the outside surface of said strip at least one insert having a generally hollow shape Conning a free volume, said free volume able to absorb the thermal expansion of said elastomer material that surrounds said insert in said guide tooth or said relief element, resulting from an increase in temperature during the molding and vulcanization of said elastomer material;

closing the mold and heating the components of said rubber track to vulcanize and bond said components between themselves.

* * * * *

UNITED STATES PATENT AND TRADEMARK OFFICE
CERTIFICATE OF CORRECTION

PATENT NO. : 6,609,770 B2
DATED : August 26, 2003
INVENTOR(S) : Gauthier

It is certified that error appears in the above-identified patent and that said Letters Patent is hereby corrected as shown below:

Column 8,
Line 10, "¶strip" should read -- strip --.
Line 12, "¶reinforcement" should read -- reinforcement --.

Column 10,
Line 12, "Conning" should read -- forming --.

Signed and Sealed this

Twenty-eighth Day of February, 2006

JON W. DUDAS
*Director of the United States Patent and Trademark Office*